United States Patent
Mueller et al.

(10) Patent No.: US 11,255,801 B2
(45) Date of Patent: Feb. 22, 2022

(54) CORRECTING AN IMBALANCE ON THE BASIS OF THE ACQUIRED RADIATION DATA

(71) Applicant: Siemens Healthcare GmbH, Erlangen (DE)

(72) Inventors: Hans-Juergen Mueller, Pretzfeld (DE); Michael Grasruck, Eckental Forth (DE); Matthias Berner, Herzogenaurach (DE); Florian Kiessling, Forchheim (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 0 days.

(21) Appl. No.: 16/814,268

(22) Filed: Mar. 10, 2020

(65) Prior Publication Data
US 2020/0300786 A1    Sep. 24, 2020

(30) Foreign Application Priority Data
Mar. 19, 2019   (DE) .......................... 102019203713.5

(51) Int. Cl.
*G01N 23/046*   (2018.01)
*G01M 1/28*     (2006.01)

(52) U.S. Cl.
CPC ............ *G01N 23/046* (2013.01); *G01M 1/28* (2013.01)

(58) Field of Classification Search
CPC ................................ G01N 23/046; G01M 1/28
See application file for complete search history.

(56) References Cited

U.S. PATENT DOCUMENTS

| | | | |
|---|---|---|---|
| 9,636,079 B2 | 5/2017 | Bredno et al. | |
| 2003/0159508 A1* | 8/2003 | Halsmer | A61B 6/4441 73/462 |
| 2007/0041488 A1* | 2/2007 | Hoheisel | A61B 6/035 378/4 |
| 2007/0172033 A1 | 7/2007 | Gorges et al. | |
| 2013/0259344 A1* | 10/2013 | Petersilka | A61B 6/507 382/131 |

(Continued)

FOREIGN PATENT DOCUMENTS

| | | |
|---|---|---|
| DE | 102005059301 A1 | 6/2006 |
| DE | 102016213947 A1 | 2/2018 |

*Primary Examiner* — Blake C Riddick
(74) *Attorney, Agent, or Firm* — Harness, Dickey & Pierce, P.L.C.

(57) ABSTRACT

A method is for correcting an imbalance in a computed tomography system, in which a supporting structure includes a radiation source is fitted on a fixed mounting frame. The supporting structure rotates together with the radiation source about a measurement space, in which is fixed in place a measurement object having a known attenuation response for the radiation emitted by the radiation source. The method includes detecting first measurement data of the radiation while the supporting structure rotates about the measurement object, determining an imbalance arising during the rotation of the supporting structure on the basis of the acquired first measurement data of the radiation, and determining a position and a weight of at least one counterweight on the supporting structure in order to reduce the determined imbalance, or determining correction data, which is used to correct the imbalance in software.

10 Claims, 3 Drawing Sheets

(56) References Cited

U.S. PATENT DOCUMENTS

| | | | |
|---|---|---|---|
| 2015/0103972 A1* | 4/2015 | Bredno | A61B 6/4233 |
| | | | 378/7 |
| 2017/0172532 A1* | 6/2017 | Flohr | A61B 6/032 |
| 2017/0188988 A1* | 7/2017 | Aasen | A61B 6/4435 |
| 2017/0258428 A1* | 9/2017 | Distler | A61B 6/4488 |
| 2017/0311921 A1* | 11/2017 | Feuerlein | A61B 6/542 |
| 2017/0354389 A1* | 12/2017 | Eichenseer | G01T 1/247 |
| 2018/0075627 A1* | 3/2018 | Bruder | A61B 6/405 |
| 2018/0172854 A1* | 6/2018 | Moore | G01N 23/046 |
| 2018/0325471 A1 | 11/2018 | Ji et al. | |

\* cited by examiner

CORRECTING AN IMBALANCE ON THE BASIS OF THE ACQUIRED RADIATION DATA

PRIORITY STATEMENT

The present application hereby claims priority under 35 U.S.C. § 119 to German patent application number DE 102019203713.5 filed Mar. 19, 2019, the entire contents of which are hereby incorporated herein by reference.

FIELD

Embodiments of the invention generally relate to a method for correcting an imbalance in a computed tomography system. In addition, embodiments of the invention generally relate to a computed tomography system and also a computer program product and an electronically readable data storage medium.

BACKGROUND

In all rotating or rotational computed tomography systems there are dynamic effects that arise as a result of imbalances in the rotating components. These imbalances can be so severe that they affect the operating life of the components. In addition, they can have a negative impact on the operation of the various components or on the image quality.

Until now, the imbalances in a rotating supporting structure (also known as a gantry) comprising the radiation source were handled in various ways:

At low speeds of rotation, and if there is no negative impact on the operation or the operating life of the rotating parts, no balancing of the rotating parts takes place.

The components to be mounted on the rotating plate are checked individually to ascertain whether the weight, the center of gravity, and the position of this center of gravity lie within a specified tolerance. This tolerance has been established in advance in order to determine when the imbalance has negative consequences. An initial counterbalancing of the imbalance is performed using counterweights, which offset the imbalances.

For systems in which the speed of rotation of the gantry is higher, the residual imbalances are detected, for instance using sensors or mechanical measurement device(s). Then the counterweights are mounted on one plane or two separate planes according to the information from the sensors, which involves determining the plane and angular position of the counterweight.

The aforementioned procedure is performed once or repeatedly during the manufacture of the computed tomography system until a desired result is achieved. This procedure, however, is also performed on some systems installed at the end-user's premises, for instance performed by service personnel when replacing components. For this purpose, the sensors or other measurement device(s) are permanently installed in the system, or the service personnel must bring external measurement device(s) with them.

In addition, the service personnel require counterweights on site. Thus correcting imbalances is time-consuming, especially in operation.

SUMMARY

At least one embodiment of the present invention further simplifies determining and correcting the imbalances.

The claims describe further embodiments.

According to a first embodiment, a method for correcting an imbalance in a computed tomography system is provided, in which a supporting structure comprising a radiation source is fitted on a fixed mounting frame, which supporting structure rotates together with the radiation source about a measurement space. In this measurement space is fixed in place a measurement object that has a known attenuation response for the radiation emitted by the radiation source. In the method, first measurement data of the radiation is detected while the supporting structure rotates about the measurement object. The imbalance that arises during the rotation of the supporting structure is determined on the basis of the acquired first measurement data of the radiation from the radiation source, and a position and a weight of at least one counterweight is determined on the supporting structure in order to reduce the determined imbalance.

In addition, a method for correcting an imbalance in a computed tomography system is provided, in which a supporting structure comprising a radiation source is fitted on a fixed mounting frame, wherein the supporting structure rotates together with the radiation source about the measurement space, in which is fixed in place the measurement object having a known attenuation response for the radiation emitted by the radiation source. In this method, the first measurement data of the radiation is likewise detected while the supporting structure rotates about the measurement object.

Furthermore, the imbalance arising during the rotation of the supporting structure is determined on the basis of the acquired first measurement data of the radiation. In addition, correction data is determined from the determined imbalance. The correction data is used to reduce the impact of the determined imbalance during acquisition of further measurement data, by applying the correction data to further measurement data acquired by the computed tomography system in order to calculate corrected measurement data of the radiation, for which data the impact of the imbalance is reduced compared with the first measurement data.

In this embodiment, a software algorithm, for instance, corrects the acquired measurement data by way of the correction data, which correction data can be used in further measurements using the computed tomography system in order to reduce the impact of the imbalance. With this embodiment, there is no need for counterweights to be fitted actively on site; the correction is made solely by way of the calculated correction data, which corrects the imbalance.

In addition, the associated computed tomography system is provided in an embodiment, which comprises a mounting frame, which is fixed in position, and a supporting structure, which is connected to the mounting frame and, together with a radiation source, which is fitted to the supporting structure, is able to rotate about the measurement space. The computed tomography system comprises a detector unit for detecting the radiation, and a control unit, which is designed to detect, or determine, the first measurement data of the radiation while the supporting structure rotates about the measurement object, wherein the control unit is additionally designed to determine by way of the acquired first measurement data of the radiation, the imbalance arising during the rotation of the supporting structure. The control unit is also designed either to determine correction data as mentioned above, or to determine a position and a weight of at least one counterweight, in order to reduce the imbalance.

According to an embodiment, a method is for correcting an imbalance in a computed tomography system, in which a supporting structure including a radiation source is fitted on a fixed mounting frame, the supporting structure being configured to rotate together with the radiation source about a measurement space in which is fixed in place a measurement object having a known attenuation response for radiation emitted by the radiation source, the method comprising:

detecting first measurement data of the radiation while the supporting structure rotates about the measurement object;

determining whether or not an imbalance arises during the rotation of the supporting structure based upon the first measurement data of the radiation detected;

determining a position and a weight of at least one counterweight on the supporting structure to reduce a determined imbalance, upon the determining indicating that an imbalance arises.

According to an embodiment, a method is for correcting an imbalance in a computed tomography system is disclosed, in which a supporting structure including a radiation source is fitted on a fixed mounting frame, the supporting structure being configured to rotate together with the radiation source about a measurement space in which is fixed in place a measurement object having a known attenuation response for radiation emitted by the radiation source, the method comprising:

detecting first measurement data of the radiation while the supporting structure rotates about the measurement object;

determining whether or not an imbalance arises during the rotation of the supporting structure based upon the first measurement data of the radiation detected;

determining correction data, upon the determining indicating that an imbalance arises, based upon the imbalance determined; and calculating corrected measurement data of the radiation by applying the correction data determined to the further measurement data, the corrected measurement data calculated being usable to reduce impact of the imbalance compared with the first measurement data.

According to an embodiment, a non-transitory computer program product stores program segments, directly loadable into a memory of a programmable controller of a computed tomography system, to perform the method of claim 1 when the program segments are executed by the programmable controller.

According to an embodiment, a non-transitory electronically readable data storage medium stores electronically readable control information, designed to perform the method of claim 1 when the electronically readable control information is executed by a controller of a computed tomography system.

According to an embodiment, a computed tomography system comprises:

a mounting frame, fixed in position;

a supporting structure, rotatably connected to the mounting frame, configure to rotate about a measurement space together with a radiation source fitted on the supporting structure, a measurement object, having a known attenuation response for the radiation emitted by the radiation source, being fixed in place in the measurement space;

a detector unit, designed to detect the radiation; and a controller, designed to:

detect first measurement data of the radiation while the supporting structure rotates about the measurement object, determine whether or not an imbalance arise during the rotation of the supporting structure, based upon the first measurement data of the radiation detected, and determine, upon arising of an imbalance being determined, a position and a weight of at least one counterweight on the supporting structure in order to reduce the imbalance.

According to an embodiment, a computed tomography system comprises:

a mounting frame, fixed in position;

a supporting structure, rotatably connected to the mounting frame, configure to rotate about a measurement space together with a radiation source fitted on the supporting structure, a measurement object, having a known attenuation response for the radiation emitted by the radiation source, being fixed in place in the measurement space; and a detector unit, designed to detect the radiation;

a controller, designed to:

detect first measurement data of the radiation while the supporting structure rotates about the measurement object, determine whether or not an imbalance arise during the rotation of the supporting structure, based upon the first measurement data of the radiation detected, determine, upon arising of an imbalance being determined, correction data based upon the determined imbalance, and calculate corrected measurement data of the radiation by applying the correction data determined to the further measurement data, the corrected measurement data calculated being usable to reduce impact of the imbalance compared with the first measurement data.

The features presented above and described below can be used not just in the corresponding explicitly presented combination but also in other combinations unless explicitly stated otherwise.

BRIEF DESCRIPTION OF THE DRAWINGS

The invention is described in greater detail below with reference to the accompanying drawings.

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/ hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

According to a first embodiment, a method for correcting an imbalance in a computed tomography system is provided, in which a supporting structure comprising a radiation source is fitted on a fixed mounting frame, which supporting structure rotates together with the radiation source about a measurement space. In this measurement space is fixed in place a measurement object that has a known attenuation response for the radiation emitted by the radiation source. In the method, first measurement data of the radiation is detected while the supporting structure rotates about the measurement object. The imbalance that arises during the rotation of the supporting structure is determined on the basis of the acquired first measurement data of the radiation from the radiation source, and a position and a weight of at least one counterweight is determined on the supporting structure in order to reduce the determined imbalance.

In the present case, the imbalance is detected on the basis of the detected radiation emitted by the radiation source to produce CT images rather than using additional sensors located on the computed tomography system.

In addition, a method for correcting an imbalance in a computed tomography system is provided, in which a supporting structure comprising a radiation source is fitted on a fixed mounting frame, wherein the supporting structure rotates together with the radiation source about the measurement space, in which is fixed in place the measurement object having a known attenuation response for the radiation emitted by the radiation source. In this method, the first measurement data of the radiation is likewise detected while the supporting structure rotates about the measurement object.

Furthermore, the imbalance arising during the rotation of the supporting structure is determined on the basis of the acquired first measurement data of the radiation. In addition, correction data is determined from the determined imbalance. The correction data is used to reduce the impact of the determined imbalance during acquisition of further measurement data, by applying the correction data to further measurement data acquired by the computed tomography system in order to calculate corrected measurement data of the radiation, for which data the impact of the imbalance is reduced compared with the first measurement data.

In this embodiment, a software algorithm, for instance, corrects the acquired measurement data by way of the correction data, which correction data can be used in further measurements using the computed tomography system in order to reduce the impact of the imbalance. With this embodiment, there is no need for counterweights to be fitted actively on site; the correction is made solely by way of the calculated correction data, which corrects the imbalance.

In addition, the associated computed tomography system is provided in an embodiment, which comprises a mounting frame, which is fixed in position, and a supporting structure, which is connected to the mounting frame and, together with a radiation source, which is fitted to the supporting structure, is able to rotate about the measurement space. The computed tomography system comprises a detector unit for detecting the radiation, and a control unit, which is designed to detect, or determine, the first measurement data of the radiation while the supporting structure rotates about the measurement object, wherein the control unit is additionally designed to determine by way of the acquired first measurement data of the radiation, the imbalance arising during the rotation of the supporting structure. The control unit is also designed either to determine correction data as mentioned above, or to determine a position and a weight of at least one counterweight, in order to reduce the imbalance.

It is possible to detect in addition to the first measurement data, second measurement data of the radiation while the radiation source is positioned in a fixed angular position with respect to the mounting frame and is not rotating about the measurement space. The first measurement data of the radiation and the second measurement data of the radiation can then be used to determine the imbalance. The second measurement data can be acquired for one fixed angular position or for a plurality of fixed angular positions.

In addition, a difference in a position of the first measurement data on a detector unit for the radiation relative to a position of the second measurement data on the detector unit can be determined. Since the first measurement data is acquired with radiation source rotating, and the second measurement data is acquired with radiation source stationary, the difference in the measured radiation data can be used to determine in what manner, and in what magnitude, the imbalance exists.

It is possible to acquire a plurality of first measurement data at different rotational speeds of the supporting structure, wherein correction data is calculated for each of the different rotational speeds. In addition, a further rotational speed is determined at which the further measurement data is acquired, wherein the correction data associated with the further rotational speed is determined and is applied to the further measurement data in order to calculate the corrected measurement data.

In this example embodiment, the imbalance is calculated for different rotational speeds. If the rotational speed at which the further measurement data was acquired is now known, the further measurement data can be corrected using the correction data associated with this rotational speed.

It is likewise possible to check during the software correction of the imbalance, whether the determined imbalance is greater than a limit value. If this is the case, a position and a weight of at least one counterweight on the supporting structure can be calculated. In this case, the imbalance is greater than a critical limit value. Usually a software correction is no longer possible when imbalances are too large, and therefore active intervention is necessary in order to fit counterweights, where again in this case the position of the counterweight(s) is determined on the basis of the detected radiation data. This can mean that for larger imbalances, use is again made of the counterweights alone or of a combination of counterweights and software correction. If the imbalance becomes greater than a second limit value, which is larger than the aforementioned limit value (the first limit value), it is also possible to make use of the combination of counterweights and software correction. As an example, for an imbalance that is less than a first limit value, the software correction would then be the device/method for correcting the imbalance, for an imbalance that is greater than the first limit value and less than a second limit value, using the counterweights would be the device/method for correction, and for an imbalance greater than the second limit value, then the combination of counterweights and software correction would be the device/method for correcting the imbalance.

The radiation emitted by the radiation source is detected by a detector unit having a plurality of detector elements in an array arrangement. It is possible in this case to determine in which actual detector elements of the array arrangement is detected the radiation of the first measurement data as a function of the angular position of the radiation source. It is also determined, as a function of the angular position of the radiation source, in which ideal detector elements the radiation of the first measurement data should have been detected assuming no imbalance exists. Then correction information can be determined that specifies for the plurality of detector elements, in which ideal detector element should have been detected radiation that is detected in the actual detector element. The correction data can then be determined from the correction information.

By focusing and guiding the X-ray beam, it is possible to determine where, without imbalance, the radiation should have struck the detection unit, namely in the ideal detector elements. Since this information is known, and the actual detector elements are known from detecting the first measurement data, it is possible to calculate for each of the detector elements a form of displacement, which specifies for a detector element, as a function of the rotational position of the radiation source, in which other, ideal detector element the radiation actually should have been detected.

The features presented above and described below can be used not just in the corresponding explicitly presented combination but also in other combinations unless explicitly stated otherwise.

The present invention is described in greater detail below using preferred embodiments with reference to the accompanying drawings. The same reference numbers denote identical or similar elements in the figures. In addition, the figures are schematic representations of various embodiments of the invention. The elements depicted in the figures are not necessarily shown to scale. They are instead depicted in a way that makes their function and purpose clear to a person skilled in the art. The connections shown in the figures between functional units or other elements can also be implemented as indirect connections, where a connection can be wireless or wired. Functional units can be implemented as hardware, software, firmware, or a combination thereof.

Figure 1:
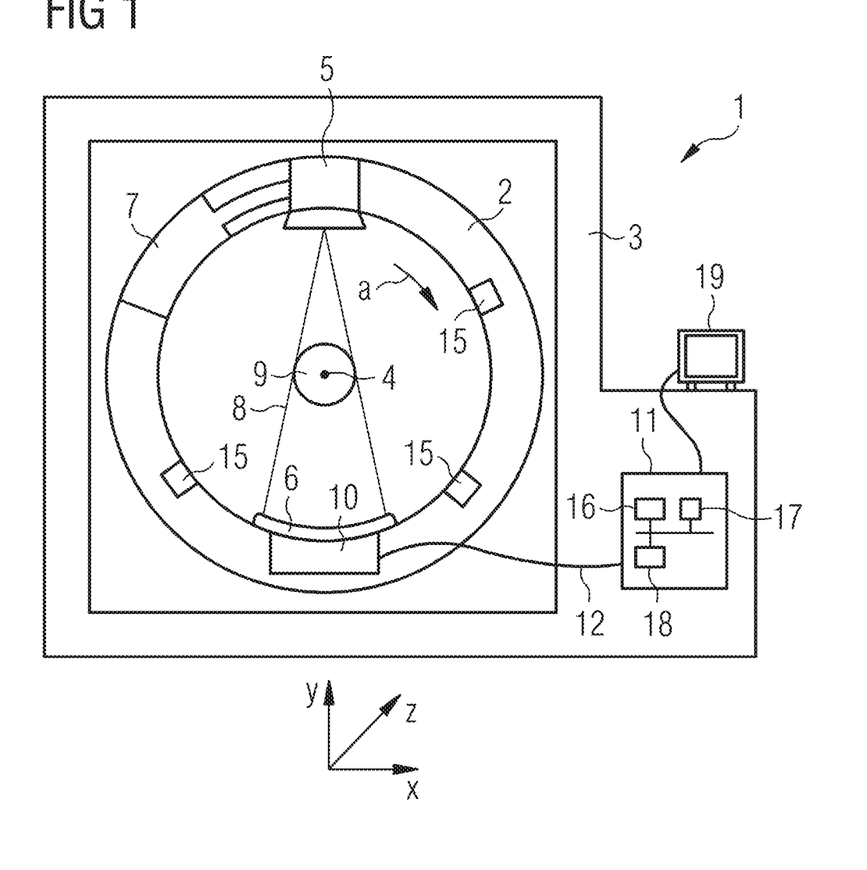
FIG. 1 shows schematically a computed tomography system, in which an imbalance can be determined and corrected by way of the acquired radiation data.

FIG. 1 shows schematically a side view of a computed tomography system 1 having an annular supporting structure 2 (also known as a gantry), which is mounted on a fixed mounting frame 3 such that it can rotate in the direction of the arrow a about a rotational axis 4, which is oriented at right angles to the drawing plane of FIG. 1. A plurality of components are arranged on the supporting structure 2, for instance the X-ray radiation source 5, and an opposite detector unit 6 and a cooling apparatus 7 (not shown in greater detail) for dissipating heat generated by the X-ray tube during operation. During operation, the supporting structure 2 rotates about the rotational axis 4, while a fan-shaped X-ray radiation beam 8 emanating from the radiation source 5 penetrates a measurement space 9 at different projection angles and is incident on the detector unit 6. The output signals from the detector unit 6 that arise in the process are used by a data acquisition device 10 to create measurement values, which are supplied to a control unit 11 of the computed tomography apparatus 1. The control unit 11 can comprise an input and output unit 16 for a user to input data and for outputting data to other units, and can comprise a processor unit 17 for controlling the computed tomography system and a memory unit 18, in which memory unit may be stored program modules and/or programs, for example, which can control the running of the computed tomography system when they are executed by the processor unit 17. In addition, the generated computed tomography images can be stored in the memory unit. A display unit 19 is also provided, on which computed tomography images or other information can be displayed for a person.

The general principles of how a CT image can be produced from the acquired measurement data are known to a person skilled in the art and are not explained further here. As explained below, the control unit 11 or the processor unit 17 can be designed to calculate an imbalance from the measurement data of the X-ray radiation, which measurement data is detected by the detector unit 10. During the manufacture or operation of the computed tomography system 1, an imbalance of the supporting structure 2 can arise both radially and axially with respect to the rotational axis 4, with the result that the supporting structure 2 does not rotate exactly in relation to its rotational axis 4. This can cause blurred CT images or result in damage to the system 1.

An imbalance of the supporting structure 2 is revealed during the rotation and affects the components and has an impact on the image quality if it is sufficiently large. The imbalance has a dynamic impact on the components that play a role in the image generation, for instance components such as the radiation source 5, a possible diaphragm, and the detector unit 6. This impact on the detected measurement data can be measured via the image data and/or detected raw data, and the magnitude and position of the imbalance determined thereby.

Figure 2:
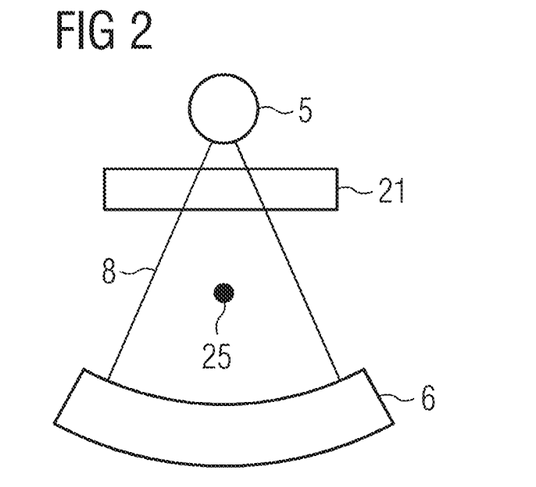
FIG. 2 shows schematically in a partial view of the computed tomography system how imbalances can be detected by way of a measurement phantom.

FIG. 2 shows schematically how the X-ray radiation emanating from the radiation source 6, after passing through a collimator 21, strikes a suitable measurement device(s), for example the measurement object 25 in the form of a spherical phantom, and then is detected by the detector unit 6. The attenuation response of the measurement object 25 for the X-ray radiation is known here.

Figure 3:
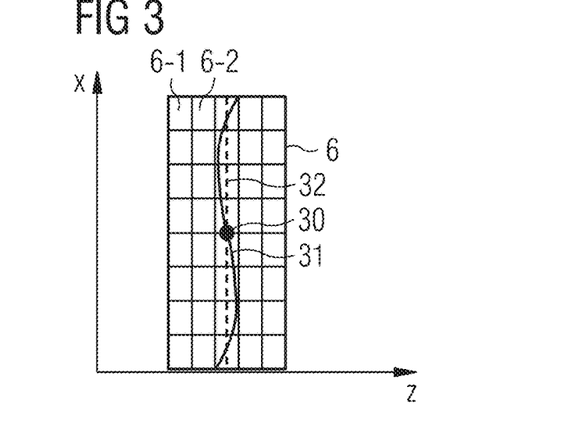
FIG. 3 shows schematically a plan view of a detector arrangement including example measurement data detected in the presence of an imbalance.

FIG. 3 shows schematically the detector unit 6 from above, where a central ray of the radiation beam 8 produces a measurement point 30 after passing through the measurement object 25. As shown schematically by the detector elements 6-1, 6-2, the detector unit 6 comprises various detector elements in an array arrangement containing a plurality of rows and columns. During rotation of the radiation source 5, the fan beam may be displaced forwards or backwards according to the imbalance that exists, as represented schematically by the measurement line 31. In an ideal system, the radiation beam or fan beam should lie on a straight line 32, which is shown dashed in FIG. 3. This means that the X-ray beam is not detected in the ideal detector elements, which lie on the dashed line 32, but on the line 31. During rotation of the radiation source, this can produce a periodically occurring deviation of the central beam and result in the deviation of the fan beam.

Figure 4:
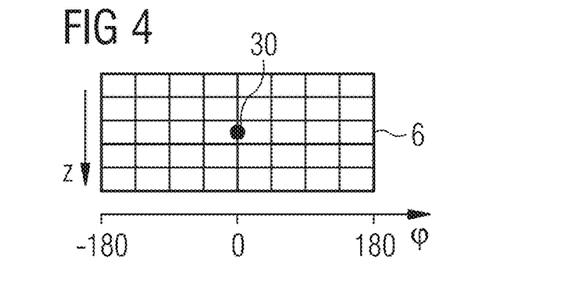
FIG. 4 shows schematically a plan view of a detector arrangement including detection of measurement data for a phantom with radiation source stationary.
Figure 5:
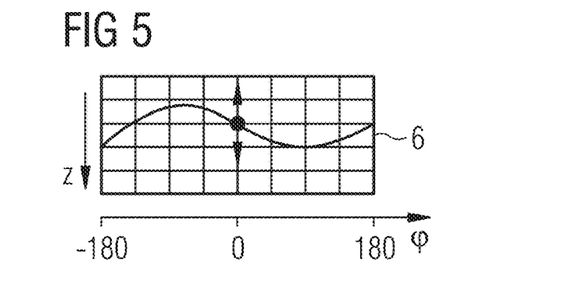
FIG. 5 shows schematically a plan view of the detector unit and how an imbalance is revealed as a function of the angle.
Figure 6:
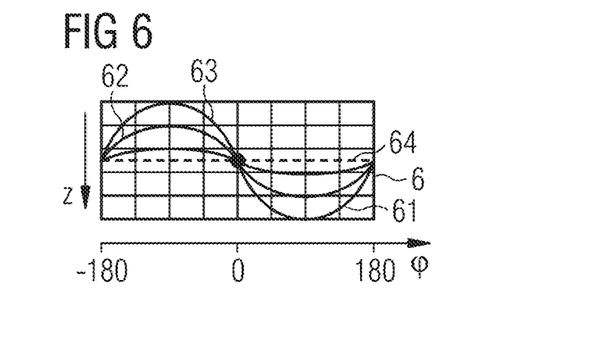
FIG. 6 shows schematically a plan view of a detector unit including measurement data detected for different rotational speeds.

FIG. 4 shows schematically how the measurement object, for a static arrangement without rotation of the radiation source, is detected as the measurement point 30, in particular in which position it is detected within the detector unit 6. FIG. 5 now shows how the position of the measurement point varies as a function of the angular position of the radiation source. The computed tomography system 1 comprises an angle sensor (not shown), which establishes precisely the angular position in which the radiation source and/or the detector unit were when the measurement data is detected by the detector unit 6. FIG. 6 now shows how the position changes for different angles of rotation as a function of the rotational speed of the supporting structure. Curve 61, for example, may correspond to a rotational speed of 120 revolutions/min, the curve 62 to a rotational speed of 180 revolutions/min, and the curve 63 to a rotational speed of 240 revolutions/min. This means that the geometrical deviation of the X-ray beam from an ideal line 64 as a result of the imbalance is known as a function of the rotational speed. For each angle of the supporting unit 2, it is possible to determine the amplitude that exists in the displacement of the radiation on the detector unit 6. Hence there is a mathematical or geometrical relationship between the measurement data as detected with radiation source rotating, and the measurement data that is detected with radiation source stationary or with radiation source rotating without an imbalance.

The imbalance may be a static or dynamic imbalance; with the dynamic imbalance, a sinusoidal oscillation such as shown in FIGS. 5 and 6, for example, occurs, whereas with a static imbalance, an oscillation of the detected measurement point 30 is detected in the XY-direction for a coordinate system such as shown in FIG. 1. Both these effects can be identified in the detected measurement data.

The deviations of the detected measurement data from the static data indicate a magnitude of the imbalance. Since it is possible to determine via the detector unit 6, position data of the radiation, and the difference in different spatial directions, for instance X and Z, and the associated angular position is known via an angular position sensor (not shown), it is possible to determine the imbalance in different positions. These relationships and image deviations can then be calculated in a software algorithm. For example, if it is detected that for a certain speed of rotation, X-ray radiation has been detected in a detector element that has the position 6, for instance, in the Z-direction, while it is known that the radiation ideally should have been detected in the detector element having the position 3, then it is possible to determine, as a function of the rotational frequency, correction data that reduces, and ideally completely eliminates, the impact of the imbalance if, before the actual image generation, it is determined for the individual detector elements, in which ideal detector elements the radiation should have been detected.

Figure 7:
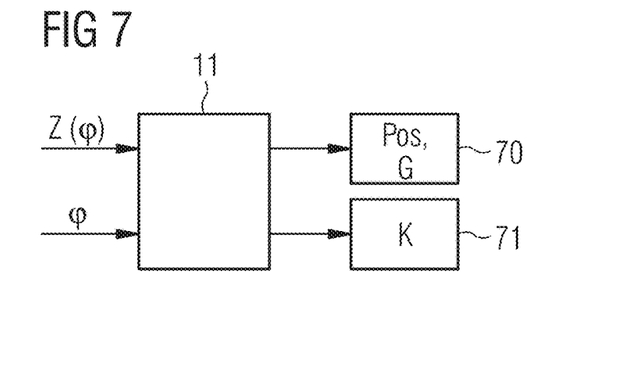
FIG. 7 shows thematically how knowing the imbalance and the position during the rotation can be used to calculate and then correct the imbalance, either by way of the counterweights or by way of software.

Referring to FIG. 7, this means that knowing the imbalance, which is shown in FIG. 7 as $Z(\varphi)$, and knowing the angular position $\varphi$, it is possible to determine what imbalance arises in the system. The control unit 11 can use this information to determine the imbalance, with there then being two options for compensating the imbalance. In a first embodiment, the control unit calculates the positions and the weight or the magnitude of the necessary counterweights, which are than fitted in order to counterbalance the imbalance. FIG. 1 shows schematically such counterweights 15. The exact angular position and the weight of the individual counterweights can be determined by the control unit 11, as represented schematically by the module 70. In another embodiment, the control unit 11 can use correction data to eliminate in software the deviations caused by the imbalance, and there is no need to fit any active counterweights on site. This is represented schematically in module 71 by the determined correction data. The correction data may specify, for instance, how, for different rotational frequencies, in which detector element radiation should ideally be detected when it is detected in an actual detector element. If, for a specific rotational frequency, the radiation is detected in a detector element having the position X1, Z1, then the correction data specifies in which detector element in a position X2, Z2 the radiation actually should have been detected. If now further measurement data is acquired, the correction data can be applied to this further measurement data before the image computation, in order to either decrease or entirely eliminate the impact of the imbalance. By determining the imbalances at different rotational frequencies, it is possible to correct measurement data acquired later that was acquired at a further rotational frequency. If correction data is directly available for this rotational frequency, this can be used, otherwise it can be interpolated from correction data for adjacent rotational frequencies.

Figure 9:
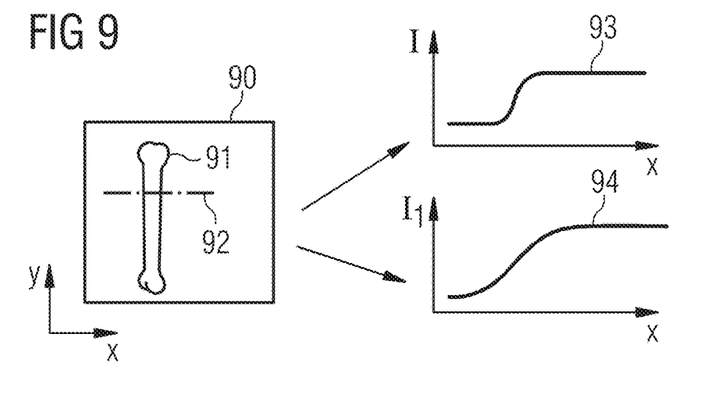
FIG. 9 shows schematically a CT image containing a bone/soft-tissue transition, and the resultant intensity distribution with and without imbalance.

FIG. 9 shows schematically the impact of an imbalance on a CT image such as the CT image 90. A bone 91 is shown schematically in the CT image. The intensity variation through the section 92 is shown on the right-hand side of FIG. 9. In a CT system without an imbalance, the intensity varies as shown by curve 93 by way of example when no imbalance effects are present. If imbalances are present, however, softening of the edge takes place at the transition between two tissues, as shown by the variation 94. A decrease in the sharpness of the depicted edges is evident here.

Figure 8:
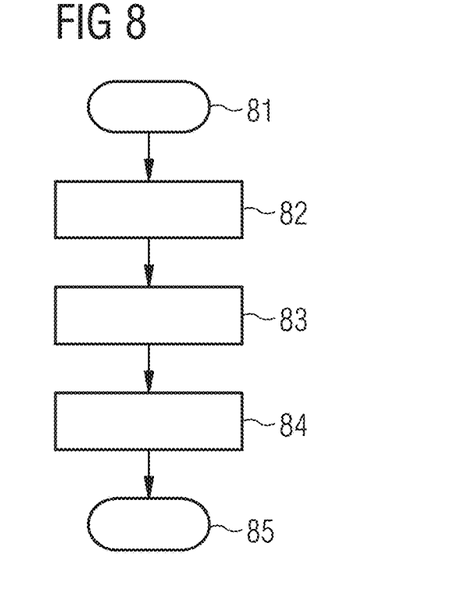
FIG. 8 shows schematically a flow diagram containing the steps for correcting an imbalance according to an embodiment of the invention.

FIG. 8 summarizes a few steps of the method described above. The method starts in a step 81, in which a measurement object having a known attenuation response is arranged in the measurement field. Hence a measurement using a rotating radiation source can be performed in step 82. In step 83, it is possible to determine an imbalance on the basis of the detected measurement data (the first measurement data). In addition to the detected first measurement data during the rotation of the radiation source in step 82, it is also possible to acquire additionally second measurement data using a non-rotating radiation source. This is not absolutely necessary, however, because theoretically it is also possible to determine by way of geometry, without data acquisition with radiation source stationary, where the fan-beam radiation should actually be incident on the detector unit 6. Overall, however, determining the imbalance can be improved by acquiring the second measurement data with a non-rotating system. In step 83, the determinations of the imbalance arising during the rotation are performed on the basis of the acquired X-ray beams. In step 84, then either a position and a weight of at least one counterweight on the supporting structure is determined, or in step 84, the correction data that can subsequently be applied to the further measurement data is calculated in software. The method ends in step 85.

Whatever the chosen solution, the sensors for detecting the imbalance that are normally mounted on the system are omitted. With the second solution, there is also no need to install counterweights. This requires a method or algorithm which compares the various measurement data and determines either the magnitude and/or position of the counterweights on the basis of the height of the amplitudes and position of the maxima.

These relationships, which are geometrically dependent, can also be determined for different mounting frames by way of sets of measurements.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for correcting an imbalance in a computed tomography system, in which a support including a radiation source is fitted on a fixed mounting frame, the support being configured to rotate together with the radiation source about a measurement space in which is fixed in place a measurement object having a known attenuation response for radiation emitted by the radiation source, the method comprising:
   detecting first measurement data of the radiation while the support rotates about the measurement object;
   determining whether or not an imbalance arises during rotation of the support based upon the first measurement data of the radiation detected;
   determining correction data, upon the determining indicating that an imbalance arises, based upon the imbalance determined; and
   calculating corrected measurement data of the radiation by applying the correction data determined to further measurement data, the corrected measurement data calculated being usable to reduce impact of the imbalance compared with the first measurement data, wherein the detecting of first measurement data of the radiation includes acquiring a plurality of first measurement data at different rotational speeds of the support, wherein the calculating of corrected measurement data includes calculating respective correction data for each of the different rotational speeds, wherein a further rotational speed is determined at which the further measurement data is acquired, and wherein the correction data associated with the further rotational speed is determined by interpolation from the respective correction data for each of the different rotational speeds and is applied to the further measurement data to calculate the corrected measurement data.

2. The method of claim 1, wherein a check is made to ascertain whether the imbalance determined is relatively greater than a limit value, and upon ascertaining that the imbalance determined is relatively greater than the limit value, the method further comprises calculating a position and a weight of at least one counterweight on the support.

3. The method of claim 1, wherein emitted radiation is detected by a detector having a plurality of detectors in an array arrangement, the method further comprising:
   determining which detectors, of the plurality of detectors, detect the radiation of the first measurement data as a function of angular position of the radiation source;
   determining as a function of the angular position of the radiation source, in which detectors, of the plurality of detectors, the radiation of the first measurement data should have been detected assuming no imbalance existed;

determining correction information for the plurality of detectors, of the plurality of detectors, specifying a detector that should have detected radiation, that is detected in an actual detector; and determining the correction data from the correction information determined.

4. The method of claim 1, further comprising:

reducing impact of the imbalance compared with the first measurement data using the correction data calculated.

5. The method of claim 1, further comprising:

detecting second measurement data of the radiation, while the radiation source is positioned in a fixed angular position with respect to the mounting frame and is not rotating about the measurement space; and using the first measurement data of the radiation and the second measurement data of the radiation detected, to determine the imbalance.

6. The method of claim 5, further comprising:

determining a difference in a position of the first measurement data, on a detector for the radiation from a position of the second measurement data, on the detector, the difference being used to determine the imbalance.

7. A non-transitory computer program product storing program segments, directly loadable into a memory of a programmable controller of a computed tomography system, to perform the method of claim 1 when the program segments are executed by the programmable controller.

8. A non-transitory electronically readable data storage medium storing electronically readable control information, designed to perform the method of claim 1 when the electronically readable control information is executed by a controller of a computed tomography system.

9. A computed tomography system, comprising:

a mounting frame, fixed in position;

a support, rotatably connected to the mounting frame, configured to rotate about a measurement space together with a radiation source fitted on the support, a measurement object, having a known attenuation response for the radiation emitted by the radiation source, being fixed in place in the measurement space;

a detector, designed to detect the radiation; and a controller, designed to:

detect first measurement data of the radiation while the support rotates about the measurement object, determine whether or not an imbalance during rotation of the support, based upon the first measurement data of the radiation detected, determine, upon determining an imbalance being has arisen, correction data based upon the imbalance determined, and calculate corrected measurement data of the radiation by applying the correction data determined to the further measurement data, the corrected measurement data calculated being usable to reduce impact of the imbalance compared with the first measurement data, wherein the controller is further configured to acquire a plurality of the first measurement data at different rotational speeds of the support, and wherein the controller is further configured to calculate respective correction data for each of the different rotational speeds, and wherein the controller is further configured to determine a further rotational speed at which the further measurement data is acquired, and wherein the correction data associated with the further rotational speed is determined by interpolation via the controller from the respective correction data for each of the different rotational speeds and is applied to the further measurement data to calculate the corrected measurement data.

10. The computed tomography system of claim 9, wherein the controller is further designed to reduce the impact of the imbalance compared with the first measurement data using the correction data calculated and without using counterweights.

* * * * *